United States Patent [19]

Sawyer

[11] 4,168,295

[45] Sep. 18, 1979

[54] APPARATUS FOR ENHANCING CHEMICAL REACTIONS

[75] Inventor: Harold T. Sawyer, Pacific Palisades, Calif.

[73] Assignee: Vernon D. Beehler, Los Angeles, Calif. ; a part interest

[21] Appl. No.: 837,041

[22] Filed: Sep. 27, 1977

Related U.S. Application Data

[63] Continuation-in-part of Ser. No. 633,818, Nov. 20, 1975, abandoned.

[51] Int. Cl.² .................. B01J 1/12; B01D 11/00; B01F 1/00
[52] U.S. Cl. .................. 422/111; 204/157.1 S; 204/193; 366/114; 366/115; 422/128; 423/658.5; 423/659
[58] Field of Search .................. 23/252 B, 252 R, 284; 204/193, 157.1 S, 157.1 R; 134/1; 259/1, DIG. 15, DIG. 44; 310/26; 423/1, 659, 658.5; 422/108, 110, 111, 127, 128; 366/114, 115

[56] References Cited

U.S. PATENT DOCUMENTS

| | | | |
|---|---|---|---|
| 2,071,260 | 2/1937 | Holden | 204/157.15 X |
| 2,717,768 | 9/1955 | Carpentier | 366/114 |
| 2,960,317 | 11/1960 | Bodine, Jr. | 366/117 |
| 2,973,312 | 2/1961 | Logan | 134/1 X |
| 2,977,199 | 3/1961 | Quittner | 137/3 X |
| 3,464,672 | 9/1969 | Massa | 366/115 |
| 3,527,611 | 9/1970 | Newfarmer | 134/1 X |

OTHER PUBLICATIONS

T. J. Bulat, The Role of Cavitation in Sonic Energy Cleaning, ASTM, 1962.

*Primary Examiner*—Joseph Scovronek
*Attorney, Agent, or Firm*—Beehler, Mockabee, Arant & Jagger

[57] ABSTRACT

An apparatus for enhancing chemical reactions in a constantly flowing stream of liquid character fortified with oxidizing agents, such as air or oxygen or other chemical agents, makes use of an inner resonant tube concentrically mounted within an outer resonant tube with the walls of the tubes spaced from each other forming an annular passageway for the flow of liquid from one end of the passageway to the other. One or more sets of radially spaced ultrasonic transducers are located on the outside wall of the outer resonant tube thereby to create an ultrasonic cavitation condition in the liquid as it flows through the annular passageway.

19 Claims, 13 Drawing Figures

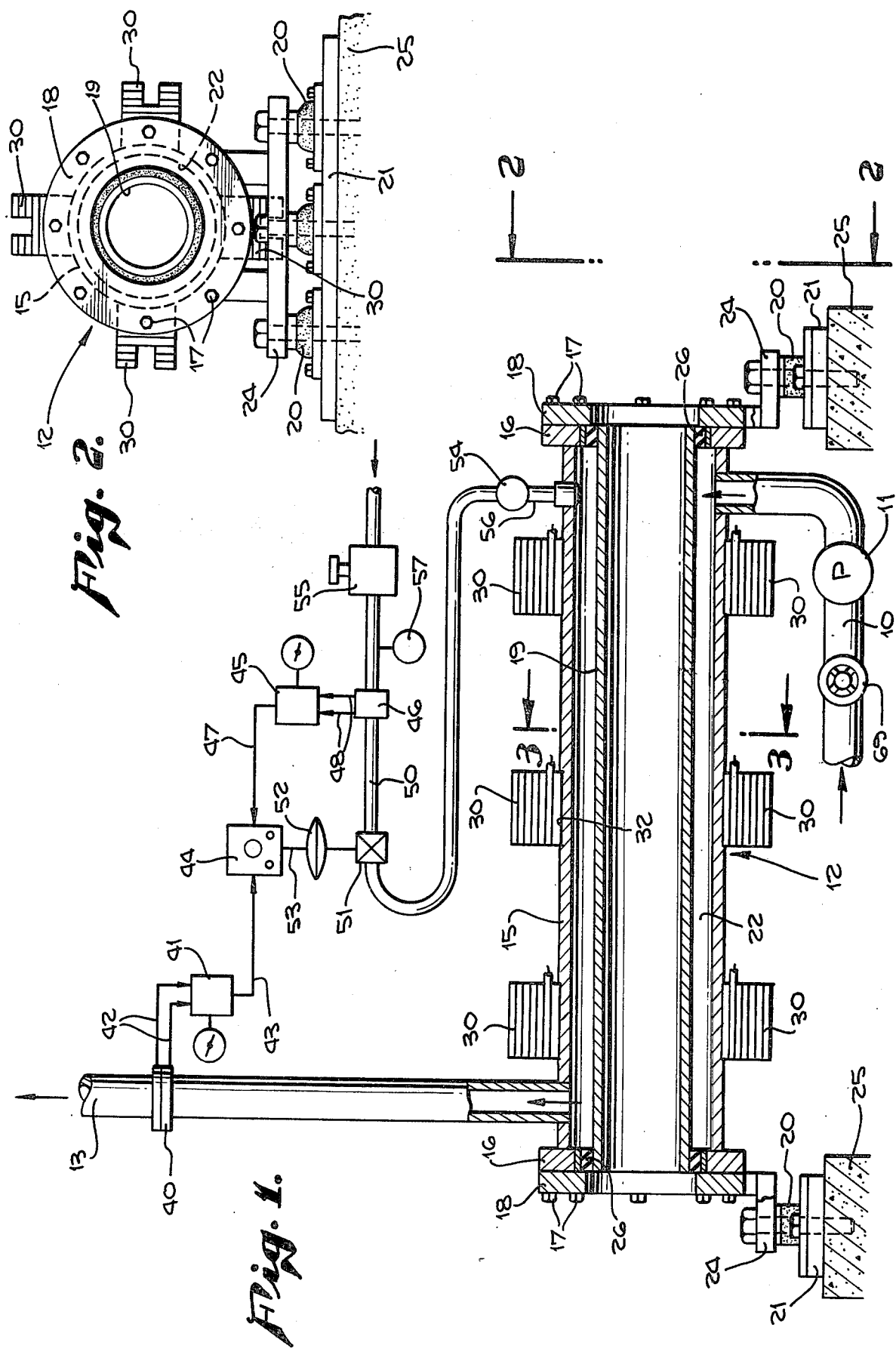

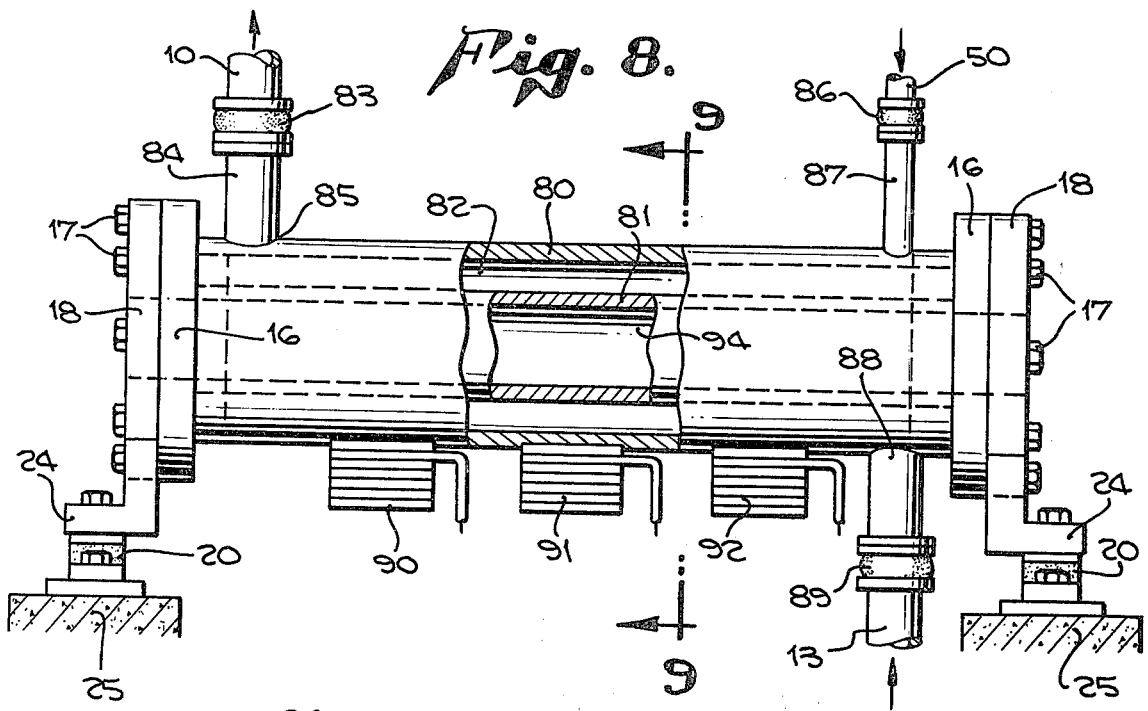
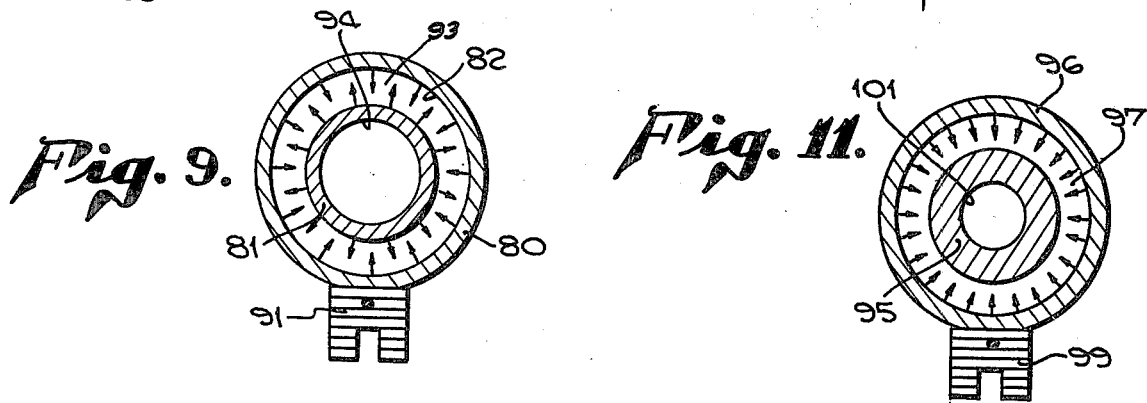
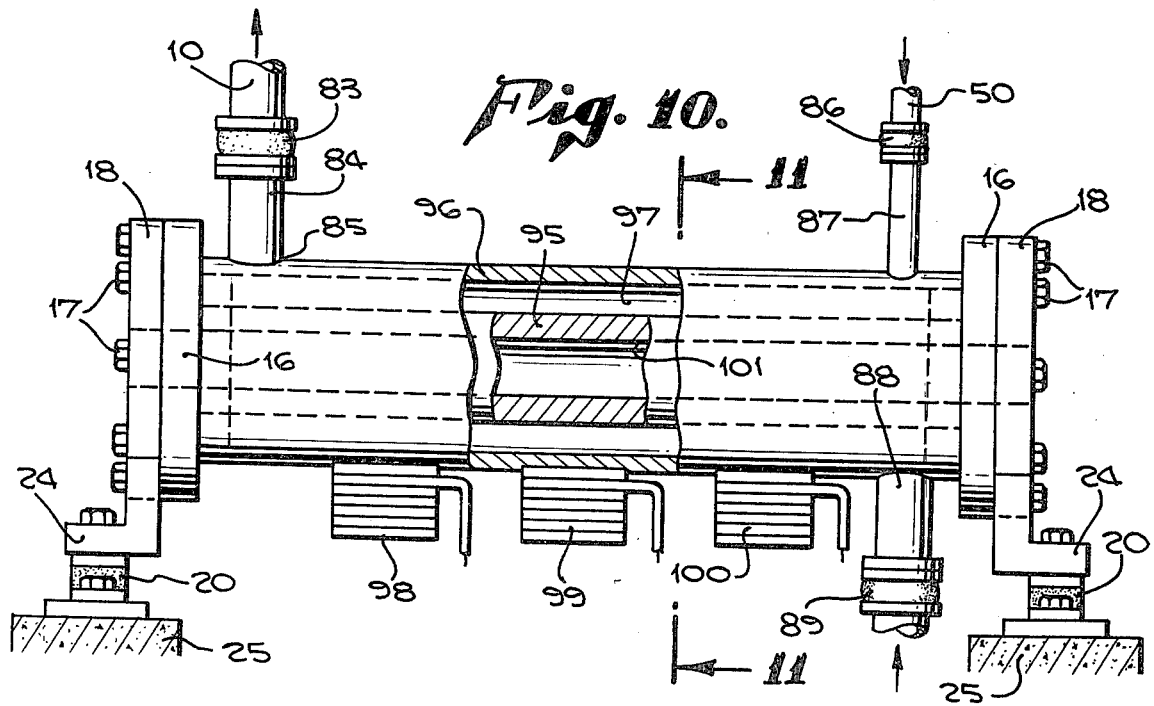

APPARATUS FOR ENHANCING CHEMICAL REACTIONS

This is a continuation in part of application Ser. No. 633,818, file of Nov. 20, 1975, now abandoned.

Although ultrasonic cavitation of liquids has been resorted to in the past, as for example cleaning of metal objects, and also for processing purposes as evidenced by U.S. Pat. No. 3,464,672, the objective has been to transmit sound energy directly to the liquid. In U.S. Pat. No. 3,464,672 material such as rubber normally used as sound insulation pads because of having virtually no modulus of elasticity, has been used in tubular form as a support for transducers. Because of its sound deadening property the rubber tube is incapable of resonance in the ultrasonic range and merely holds the transducers in a position such that they can drive the sound energy through the rubber wall to the liquid. Since no ultrasonic resonance can be set up in the rubber wall no ultrasonic energy will pass to the liquid except directly at the locations of the transducers, which must be placed virtually edge to edge in order to get maximum application of energy to the liquid.

In general, techniques and equipment used for example in the processing and recovery of such metals as gold, uranium, silver and copper have been improved through better utilization of instruments and controls. Over the years there have obviously been improvements in process equipment and techniques used in the operation. The introduction of new technology, equipment and methods such as ultrasonic hydrometallurgical treatment of the slurry or pulp during the leaching operation, for example, has not been applied.

Improving the effectiveness of existing plant operations through the use of alternative process technology and the implementation of advances should lead to higher metal recovery and a reduction of metal lost to the tailing dumps.

In the case of gold recovery processing, for example, cyanide leaching is generally carried out in large tanks known as agitators or leaching tanks where the slurry or pulp having a consistency of between 30 and 50 percent solids is agitated generally by a combination of propellers and airlift injection to minimize diffusional limitations and to provide the oxygen or other oxidizing agents necessary for oxidation and resultant cyanide reaction.

Oxygen is recognized as an indispensable oxidizing agent in the dissolution of gold or other metals. Pure oxygen is generally too expensive to use. Therefore, atmospheric air is the customary source of the required oxygen gas used as an oxidizing agent. The degree of aeration of the cyanide pulp in gold processing is of significant importance and concern to the metallurgist since some ores, particularly silver ore, require more aeration than others. Agitation may be considered as stirring or mixing of the pulp with an excess of air in circular tanks of sufficient capacity to allow the balance of the gold to dissolve.

The economic incentive for higher recovery efficiency of metals during the leaching process is substantial and suggests improvement through better use of new technology. For example, it has been shown that a typical gold producing company with a recovery rate of 93 percent and with a sales of 50 million dollars annually could recover a significant amount of gold should the recovery efficiency be increased one percent to a value of 94 percent.

One of the current problems that occurs during the gold leaching process is to provide the proper rate of oxygen or air flow necessary for oxidation within the cyanide concentration to recover the maximum amount of gold from the ore. The atmospheric air which is introduced at the bottom of the agitator tanks causes an air lift in the form of bubbles which rise in part to the surface of the tanks. A portion of the agitation for mixing is provided by propeller mixing blades at the lower portion of the tanks.

There is commonly a strong resistance to the mixing of air or other oxidizing chemical agents with the cyanide solution during this stirring and airlift operation. The resistance is caused by the surface tension interface of the air bubbles and solution. As a result only a portion and an unpredictable amount of the air in the form of bubbles is dissolved in the cyanide pulp solution to provide for oxidation. Furthermore, there is no certain or known controllable means of determining an accurate air flow rate utilizing conventional equipment to provide the ultimate desired amount of oxidation and resultant reaction for maximum metal recovery.

Another problem relates to the time required for dissolution of metals in the agitation circuit. Although an important part of gold, for example, will dissolve in the grinding circuit if it is performed in a cyanide solution, there still remains significant undissolved values that require complete oxidation to more fully complete the dissolution. The total retention time required in the agitation circuit will usually range from 6 hours to 48 hours and sometimes somewhat longer on silver ores. Part of the problem therefore is the exceptionally long time required for processing and final dissolution in the agitator circuit.

It is therefore among the objects of the invention to provide a new and improved means and method for increasing the efficiency of reaction in such a chemical reactor where material passing through it is in the form of a slurry or pulp in a chemical solution.

Another object of the invention is to provide a new and improved agitating system and method which effectively and efficiently reduces surface tension which impairs to a degree the desired reaction in the slurry while it is being subjected to oxidation.

Another object of the invention is to provide a new and improved apparatus and method which is effective in improving reaction between substances in the slurry while the slurry is in transit, and without impairing in any way the rapidity of passage of the slurry from its source to an ultimate point of deposition.

Still another object of the invention is to provide a new and improved agitating device and system of relatively simple and inexpensive construction capable of being used as part of the system for passing the slurry from its source to its point of deposition, the apparatus being such that it tends to keep itself consistently clean, which operates at relatively high efficiency, which is capable of readily being serviced during the course of operation without need for a shut-down, and which significantly improves the efficiency of chemical reaction in the slurry.

Another object of the invention is to provide a new and improved device to complete more fully the dissolution and subsequent recovery of metals in a flowing stream.

With these and other objects in view, the invention consists of the construction, arrangement, and combination of the various parts of the device, whereby the objects contemplated are attained, as hereinafter set forth, pointed out in the appended claims and illustrated in the accompanying drawings.

FIG. 1 is a schematic view of the system applied to a slurry while in transit, showing the device in section.

FIG. 2 is an end elevational view of the device taken on the line 2—2 of FIG. 1.

FIG. 8 is a side elevational view partially broken away of another form of the invention.

FIG. 9 is a cross sectional view on the line 9—9 of FIG. 8.

FIG. 10 is a side elevational view partially broken away of another form of the invention.

FIG. 11 is a cross sectional view on the line 11—11 of FIG. 10.

Figure 7:
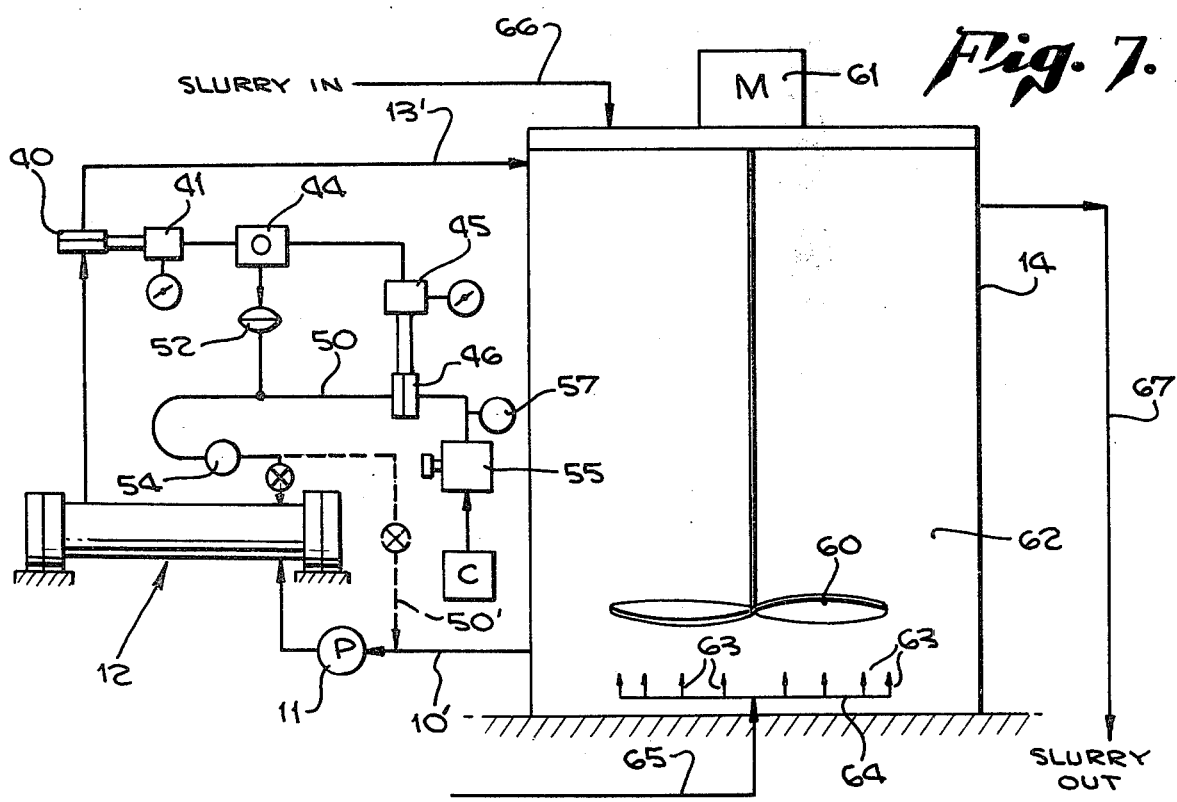
FIG. 7 is a schematic representation of the system including an agitator tank.

In an embodiment of the invention chosen for the purpose of illustration, there is shown in FIG. 1 a supply conduit 10 for a stream of substantially liquid material, such as a pulp or slurry, which is passed through the system by action of a variable speed pump 11 and evacuated through a discharge conduit 13. A chemical reactor assembly indicated generally by the reference character 12 receives the stream from the supply conduit and ultimately passes it to the discharge conduit 13. The discharge conduit may, on some occasions be directed to recirculating the slurry back to the process through appropriate conventional means or on occasions may pass the slurry to an agitator tank 14 as shown in FIG. 7, from which it can be recirculated back to the supply conduit 10.

The chemical reactor assembly 12 consists of an outer resonant tube 15 having flanges 16 at respective opposite ends bolted in sealed condition by means of bolts 17 to respective flanges 18 supporting in part an inner resonant tube 19.

For a tube like the tube 19 to be resonant it should be of resilient stiff material with a modulus of elasticity in the range of from about 30,000,000 to about 21,500,000 or slightly lower. This is recognizably the range for metallic materials such as steel, stainless steel, nickel, alloys of copper and perhaps some of the harder alloys of aluminium with the possible inclusion of some specially constituted non-metallic materials. The stability inherent in the metallic materials is a highly desireable characteristic. Materials such as soft rubber or fiber reinforced rubber, or comparable pliable synthetic materials of which various hoses have been made and even phenolics with a modulus of 500,000 are clearly outside the required range and could not resonate in the ultrasonic range.

The outer flanges 18 have feet 24, which rest on resilient isolation supports 20. These in turn are carried on a pad 21 on a stationary bed 25 thereby to mount the chemical reactor in position.

As shown, the inner resonant tube has an outside diameter substantially smaller than the inside diameter of the outer resonant tube providing an annular passageway 22 therebetween. As shown, it is the passageway 22 which the supply conduit 10 is directed into and from which the discharge conduit 13 flows.

An annular isolation ring 26 at each end serves to isolate and seal the inner resonant tube from the outer resonant tube 15 and to permit the tubes to be isolated in resonance.

In designating the ring 26 as an isolation ring consideration must be given to the intensity and wave length of the ultra sonic character of the device. The isolation material should normally be much denser than that acceptable to sonic energy in the audible range and may, on occasions, be omitted entirely.

Mounted on the exterior of the outer resonant tube 15 are three sets of ultrasonic magnetostrictive transducers 30. In the chosen embodiment there are four such transducers in each set and all are mounted at an appropriate wave length antinodal point. In practice one or more transducers may be used depending on the power requirement of the system or a multiple number as shown. The ultrasonic heavy duty magnetostrictive transducers 30 are substantially conventional in their mechanical makeup, and adapted to be supplied with electric current from their power supply generator and through appropriate leads 31.

Piezoelectric transducers are customarily made with a resonant diaphragm at which point the high frequency sound energy is accummulated and from which the sound wave energy is projected. In the device herein disclosed the resonant tube is itself a diaphragm for the magnetostrictive transducers and irrespective of whether one or a multiple number of transducers are employed the entire tube is set in resonance at the same ultrasonic frequency. The transducers and the entire length and circumference being in that way activated produces a source of sound wave energy applied completely throughout the entire surface of contact of the liquid with the resonant tube. A high power transfer of sound energy is in that way made possible.

In the present disclosure, the structure itself, namely the entire length and circumference of the resonant tube or tubes, as the case may be, provides a diaphragm for sound emission in the ultrasonic range which generates the desired cavitation in liquid flowing adjacent to it. By providing dual resonant tubes the liquid passage 22 is kept narrow and substantially all liquid passes in contact with the resonant tube exposed surfaces. When both tubes are set in resonance by transducer action, cavitation is produced over an area encompassing the entire length and circumference of the liquid media to be treated.

For greater convenience the transducers are shown mounted on the exterior of the outer tube. For generating resonance directly in the inner tube the transducers could be mounted on the interior of the inner tube. The inner surface of outer resonant tube 15 and the outer surface of inner resonant tube 19 are plasma sprayed for corrosion and abrasion resistance.

To integrate the transducers with the wall of the resonant tube, and employ the tube as the transducer diaphragm, the transducers are silver brazed directly to the resonant tube. Flats 32 may be milled on the surface of the tube itself at the transducer locations where the brazing is to take place.

In the system as shown in FIG. 1 an orifice flange 40 is provided in the discharge conduit 13 which is serviced by a flow transmitter-indicator 41 through leads 42. From the flow transmitter a lead 43 leads to a flow ratio controller 44. The same flow ratio controller also services a second flow transmitter-indicator 45 and orifice flange 46 through leads 47 and 48. As noted, the orifice flange 46 is in a line 50 for the introduction of oxygen or other appropriate oxidizing agent to the system. In the line 50 is an automatic control valve 51, the operation of which is dependent upon operation of the flow ratio controller 44 acting on a diaphragm valve actuator 52 thru appropriate connection 53.

A pressure reducing control valve 55 and companion pressure gauge 57 are located in the line 50 upstream with respect to the orifice flange 46. At the downstream discharge end of the line 50 and located within the annular passageway 22 is an aspirator nozzle 56. A check flow valve 54 is shown near the discharge of line 50. Oxygen or other appropriate oxidizing agent flows from the line 50 through the slurry within the annular passageway 22. The slurry is forced through the annular passageway 22 by means of the pump 11 which is located at the inlet end of the annular passageway. A manual valve 69 may be mounted in the supply conduit 10 as shown.

FIG. 7 represents a recirculation system and shows the chemical reactor 12 and its associated equipment interconnected to for example, commercial type of propeller agitator or leaching tank 14 for continuous recirculation of the contents of the agitator tank for processing by the chemical reactor 12.

A process inflow line 66 passes pulp or slurry to the tank reservoir chamber 62, and an outflow line 67 returns the processed material to the main process system circuit. A propeller 60 within the tank driven by motor 61 provides stirring, lift and agitation for the tank's contents. In addition, the tank is provided with a series of air jets 63 located on a spreader 64 at the bottom of the tank and supplied by an auxiliary air line 65. The purpose of the jets is to provide oxidation of the tank's material and to also induce an additional air lift for agitation.

The recirculation is provided by a conduit 10' located near the bottom of the tank and a conduit 13' located near the top portion of the tank. The pump 11 passes the material through the chemical reactor and returns the contents to the agitator tank through conduit 13'.

Figure 4:
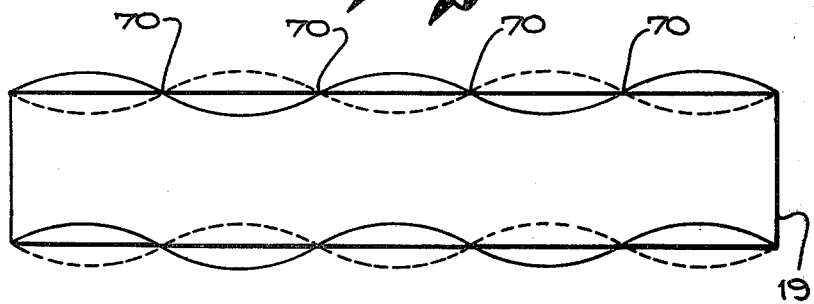
FIG. 4 is a diagrammatic showing of the axial nodal pattern.

To illustrate graphically the activity of the resonant tubes 15 and 19 there is shown in FIG. 4 a resonant pattern which contains four axial wave length nodal points 70. There are also circumferentially disposed wave length nodal points as shown advantageously in FIG. 5, namely, the nodal points 73, 74, 75, 76, 77, and 78.

Figure 3:
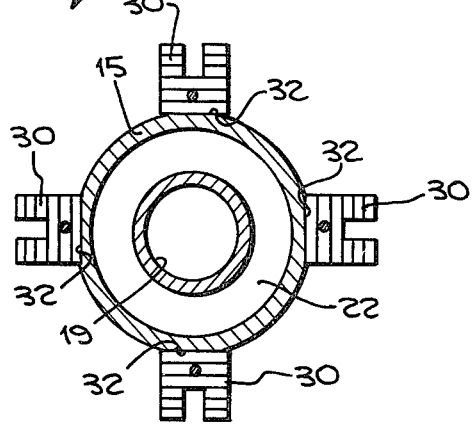
FIG. 3 is a cross-sectional view on the line 3—3 of FIG. 1.

The chemical reactor as shown in the drawings is a device to provide a controlled rate of oxidation and reaction of the pulp and cyanide solution and in proportion to the pulp flow rate, and also subject the pulp mixture solution passing through the reactor chamber to intense dispersion, mixing, cleaning, and to a chemical reaction within the confined annular passageway 22. In the passageway the mixture is processed under precisely controlled conditions by very intense ultrasonic energy which in turn produces a high energy field of cavitation energy directed in spherical and perpendicular fashion across and through the slurry solution within the annular passageway 22 as shown in FIG. 3 and as it flows through the reactor chamber.

Since the reactor is a self-contained device which can be designed to a wide range of flow rates, it lends itself to choice of locations in the cyanide leaching circuit. As desired by the metallurgist for example, an effective installation would be to utilize the chemical reactor as a recirculation device for one or more of the holding tanks, whereby flow capacities ranging from 40,000 gallons per hour or higher could be withdrawn continuously from a tank, circulated through the reactor for processing and returned to the agitator tank. In this manner, the contents of the tank would be recirculated and processed for controlled oxidation and reaction many times during processing. For larger tanks where larger rates of recirculation may be required, multiple use of the chemical reactors can be utilized.

FIG. 7 shows the conduit 10' flowing from the agitator tank 14 which transports the slurry and cyanide solution to the reactor, the flow rate of which is measured by either a segmental orifice or a flow nozzle and its transmitter. The pump 11 is shown in the line to circulate the pulp solution through the agitator assembly 12 to the tank 14. The compressed gas flow rate is measured in turn by the orifice 46 and its transmitter 45. The two flow transmitters 41 and 45 in turn transmit their individual flow rate results to the flow ratio controller 44 which automatically regulates a valve in the compressed air line to proportion and maintain a fixed ratio of airflow to pulp solution flow. The flow ratio controller 44 is equipped with a manual ratio setting to enable the metallurgist to adjust the desired value or ratio from time to time as may be required to maintain optimum oxidation and reaction taking place in the agitator holding tank closed system in order to increase the efficiency of metal recovery.

Figure 6:
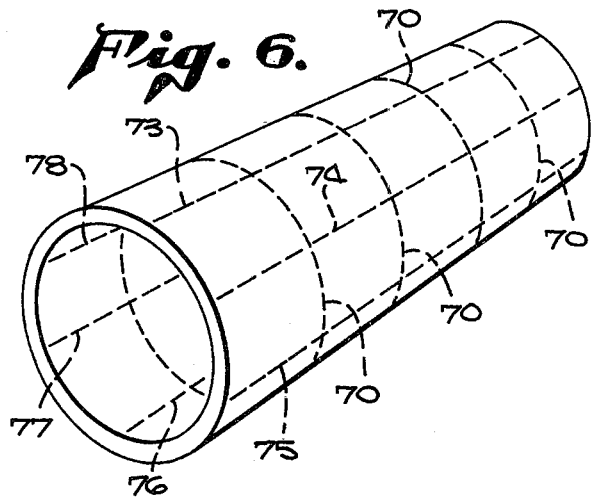
FIG. 6 is a longitudinal sectional view showing the location of both circumferential and axial nodes.
Figure 5:
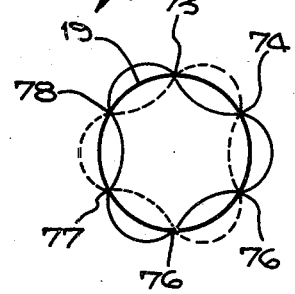
FIG. 5 is a diagrammatic representation of the circumferential nodal pattern.

The resonant tube 15 which is a cylindrical shell, is specifically designed to one of the desired axial and circumferential ultrasonic resonant frequencies that have been selected for the structure. An example of the wave length frequency patterns showing nodes and antinodes referred to for the cylindrical shell is illustrated in FIGS. 4, 5, and 6. The same discription applies also to the tube 19.

Employment of the chemical reactor in ore and metal chemical processing dictates that the cylindrical shell be designed for the ultrasonic frequency range chosen preferably at a value between 20,000 and 40,000 cycles per second. The cavitation implosions therefore in microns would permit the cavitation energy to penetrate, attack and implode the ore surfaces, pores, fissures and grain boundries and to also implode the molecules of the metals themselves. Ultrasonic heavy duty industrial magnetostructive transducers are commercially available to supply the ultrasonic frequencies required for installation on the resonant tubes.

Modern ultrasonic magnetostrictive transducers are furnished commercially with solid state power supplies that are provided with adjustable output power and adjustable frequency. These features are ideally suited for application to the chemical reactor, and also offer engineered reliability represented by 10 year guarantees.

With reference to FIG. 1 the pulp solution containing atmospheric air as an oxidizing agent enters the ultrasonic chamber namely the passageway 22, for processing where it is exposed to an intense field of cavitation where the energy thus released within the pulp and solution causes the interfaces and surface tensions of the materials to be broken and also to provide an energy means for oxidizing a good portion of the oxygen into reaction. In addition, the high energy kinetic reaction that takes place within the pulp solution causes dispersion, agitation, mixing and surface cleaning of the materials and intense implosion on the surfaces of the exposed metal to more fully release the metallic molecules into solution.

The combined resonant system consists of the resonant cylindrical tube 15 and 19, one or more transducers, or a multiple number of transducers, and its ultrasonic generator power supply. The resonant cylindrical tubes are excited sinusoidally into one of their wave length modes of natural frequency in the ultrasonic range at a chosen value between 20,000 and 50,000 cycles per second.

The longitudinal and circumferential elastic wave energy at resonance and thus released from the cylindrical tube, causes very intense acoustic compressional sinusoidal wave energy to be transmitted in perpendicular fashion from the outer resonant tube surface through the pulp solution or slurry as shown in FIG. 3. The speed of the transmitted compressional wave energy within the unpure pulp solution is estimated at 5500 feet per second. The shearing forces of the compression wave energy traveling through the pulp solution cause a very high degree of kinetic energy reaction to take place within the pulp mixture which in turn fractures and ruptures the solution into a known form of energy namely vaporous cavitation which is a commonly accepted term for such a condition.

The vaporous cavitation energy field within the solution is continuously subjected to alternating positive and negative pressure cycles which cause microscopic bubbles to be formed during the pressure cycles and to be collapsed during the negative cycles thus causing a very intense vacuuming or implosion action on all the surfaces of materials in solution, for oxidation and implosion of ore surfaces and crevices which contain molecules of metal.

Such energy life cycle transformations in three force planes take place each $10^{-9}$ of a second and form ellipsoid energy patterns in three planes which are continuously in a state of formation and collapse. It is during the negative pressure or collapse phase of the energy cycle that voids are produced, as are also vapor cavities in solution. This in turn produces very intense vacuuming action on the surfaces and crevices of the ore material in solution, sometimes referred to as an implosion effect. The implosions which take place on the surfaces of the ore even to minute surface diameters of a few microns cause the surface tensions to be broken and permit the chemical solution to produce additional dissolution of the metal by penetration into the ore crevices and to also provide for a higher degree of oxidation to take place.

Basically, there are four mechanisms involved in removing additional metal from ore while undergoing processing in a chemical reactor: (1) solvation, (2) interface exchange, (3) chemical reaction, and (4) dissolution.

In the case of gold recovery, for example, a cyanide solution serves as a chemical solvent agent for dissolving the gold from the ore. Any mechanical agitation speeds up the solvation process. The forces of cavitation will provide a direct and effective mechanical agitation.

Cavitation can also serve to break down the molecular force or interface that exists between the solution and the ore particles containing gold. The breaking of these forces can be accomplished by the direct shock or impact imparted by acoustical vaporous cavitation or can be the result of a fatiguing action caused by repeated bombardment and resulting explosions. Once the molecular attraction of the solution to the ore and metal is broken, the surface metal is imploded and cleaned and thus exposed for further dissolution.

Chemical mechanisms can also be in the form of chemical conversions or of the addition of chemical energy to the dissolution process. Among the latter the addition of air or other chemical oxidation agents are most widely used. Cavitation serves to accelerate this energy reaction. When the mechanism is a chemical conversion, the usual action is to convert the metal to a soluable form.

Cavitation aids also in these reactions by means of the great pressure differentials that are set up by the implosions in the microscopic pores, cracks and grain boundries of the ore and metal and by the heat dissipated at the moment of implosion. The cavities or voids left by these implosions are instantaneously filled with the chemical fluid solution that surrounds the ore particles and are driven by very high transitory pressures. The resulting pressures generated at the loci of these implosions have been measured up to 1000 atmospheres. Furthermore the heat dissipated at the moment of implosion has been determined to be in excess of 1000 degrees centigrade. Chemical processes can also be aided in a vaporous cavitation field by the direct mechanical agitation of cavitation, since they maintain a maximum concentration gradient of the chemical solution at the surfaces of the ore particles.

One unique feature of cavitation is that it can be generated anywhere that a compressional sound wave of sufficient intensity can penetrate, and reaction will occur deep within the interstices of an ore particle with complicated geometric configuration. Ore particle surfaces which are seemingly smooth to the naked eye have microscopic pores, crevices, cracks and grain boundries. The specific action of cavitation penetrates these minute areas with very intense transitory energy and results in implosions and resultant ruptures and fissures of the ore material at the microscopic level which can be equaled by no other known method. The implosions occurring on and within the ore particles create tremendous transitory pressures within the material. The alternative vacuum and pressure energy action reaching 1000 atmospheres of pressure occur many thousands of times per second and at resonance, which causes fatigue within the pores, cracks, grain boundries and fissures of the ore particles which forces the ore particles to be fractured to a large extent and thus to expose more fully the molecules and surfaces of metal for further recovery by means of chemical reaction and dissolution.

The solid state ultrasonic system is an efficient means to provide the energy necessary for operation of the chemical reactor. The individual power requirements, for example, for multiple transducer units is relatively low and may be supplied commercially as desired in power increments up to 12,000 watts. In special cases where very high capacities are required for a single chemical reactor, a multitude of transducers 30 representing a multiple system may be used as shown in FIG. 1. In this case the multiple transducers would be driven in phase from a single power source. An alternate installation for higher rates of circulation could be made by utilizing multiple chemical reactors.

In the form of invention of FIGS. 8 and 9 there are provided dual resonant tubes 80 and 81 the outer tube 80 being of substantially the same thickness and resonant character as the inner tube 81 which is spaced therefrom providing an annular passageway 82.

The tubes 80 and 81 are isolated from each other by the same structure described in connection with FIG. 1 and are carried by appropriate supports 20 in the same fashion.

Because of the resonant character of the outer tube 80 there is provided at the end of the supply conduit 10 a flexible isolation joint 83 of an appropriate vibration damping material through which the fluid flows to a stub conduit 84, directly connected to the outer resonant tube 80 by a rigid weldment 85. A similar flexible isolation joint 86 at the end of the line 50 carrying the oxydizing agent connects to a stub 87 by which the agent is conducted into the passageway 82 through the wall of the outer resonant tube 80.

Similarly also a discharge stub 88 connects to the discharge conduit 13 through an isolating joint 89.

The joints as described taken together with the mountings at the end of the resonant tube assembly isolate the entire reactor structure from any rigid attachment or connection which would otherwise impair the effectiveness of the ultrasonic wave action which is generated.

By way of example there are shown three transducers 90, 91, and 92, on this occasion all connected to the exterior of the outer resonant tube 80. The transducers are axially spaced one from another in such fashion that they apply their force to the outer resonant tube 80 at wave length antinodal points.

As indicated in FIG. 9 ultrasonic energy set up in the outer resonant tube 80 is transmitted by fluid material 93 to the inner resonant tube 81 causing the inner resonant tube to be excited at resonance thereby to set up a resonant wave pattern in the fluid material in an opposite direction also as indicated by the arrows in FIG. 9.

A chamber 94 through the inner tube is clear.

The embodiment of FIGS. 10 and 11 differs in that an inner tube 95 is thick walled and stationary whereas an outer tube 96 is relatively thinner walled and resonant. The tubes are concentric and radially spaced from one another providing an annular passageway 97 for the fluid material which is subject to the reaction. Here again transducers 98, 99, and 100 are mounted on the exterior of the outer tube 96 at respective wave length antinodal points to generate an ultrasonic frequency resonant wave condition such as that illustrated by the arrows of FIG. 11. In the device of FIGS. 10 and 11 there is an open chamber 101 extending through the inner tube 95.

Figure 12:
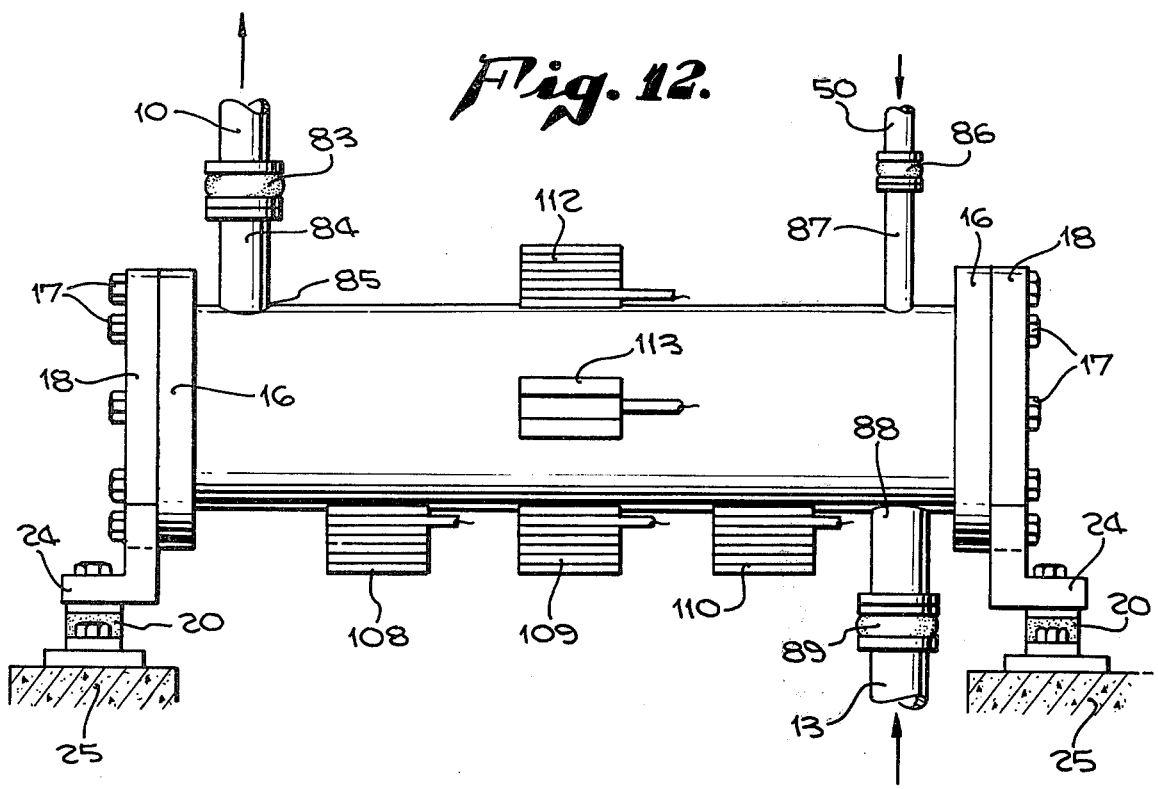
FIG. 12 is a side elevational view of still another form of the invention.

An augmented transducer pattern is illustrated in FIG. 12 where, by way of example, an inner tube 105 and an outer tube 106 are illustrated as resonant tubes comparable to the arrangement of FIGS. 8 and 9. The tubes 105 and 106 following the arrangement of the other forms of the device provide an annular passageway 107 for the fluid material which is to be reacted, there being a clear chamber 108 through the inner tube 105.

For this arrangement transducers 108, 109, and 110 are applied to the exterior of the outer tube 106 at longitudinally spaced intervals so that they are located at antinodal points for the vibration condition which is set up. On this occasion additional transducers 112, and 113 extend circumferentially around the outer tube 106 at the longitudinal midline.

With the proposed arrangement ultrasonic vibrations of two different kinds are generated in the outer resonant tube 106 thereby emphasizing the pattern of both radial and longitudinal wave action, the elements of which have already been described in connection with FIGS. 4 and 5. It should be observed further that the circumferentially disposed transducers should also be applied at antinodal points. Moreover additional circumferentially disposed transducers are contemplated at other antinodal points corresponding for example to the locations of transducers 108 and 110.

Further still, although for the embodiment of FIG. 12 several resonant tubes are shown, it may be found preferable to provide only one resonant tube as for example, making the inner tube 105 thicker walled and stationary. Further still by following the pattern of mounting of FIGS. 1 and 2, transducers of appropriate size and capacity can be mounted not only at axially spaced locations but also at circumferentially spaced locations around the inner circumference of the inner tube, where that tube is made a resonant tube.

Since the resonant character of the tube in which the transducers are mounted is appreciably significant, as well as the location of the transducers at wave length antinodal points a typical installation can be calculated.

Assuming the resonant tube to be of steel, the speed of sound in the tube can be assume to be 14,610 feet per second. The frequency imparted to ordinary steel by the transducer may be designed for 22,000 cycles per second. Therefore in the equation:

$$(14,610/22,000) = 0.6641 \text{ feet}$$

8 inches–0.6666 feet. As a consequence, the transducers, where more than one are mounted on the resonant tube, will need to be at intervals of which would be multiples of approximately 8 inches. Because of known properties of the materials and related standard mathematical constants the entire structure can be designed to have the resonant characteristics desired.

Figure 13:
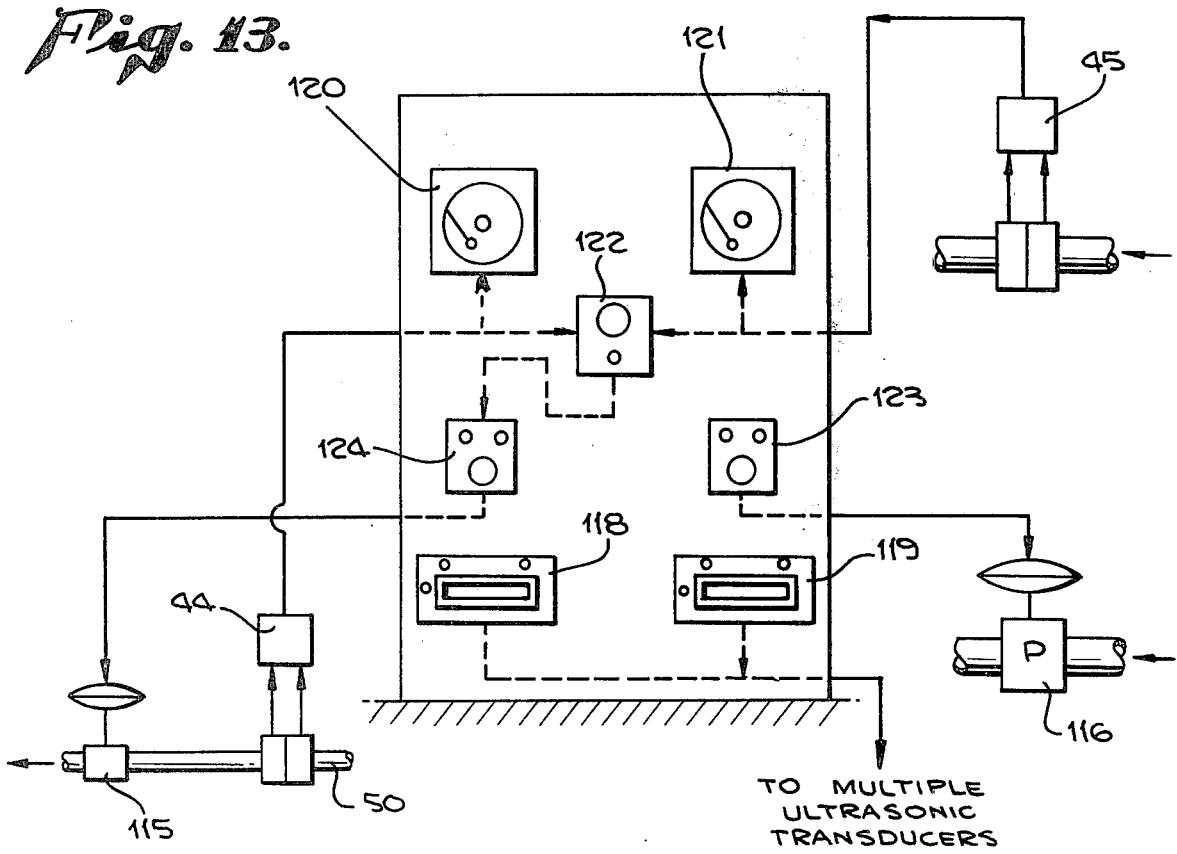
FIG. 13 is a diagrammatic representation of the control panel and related instrumentation.

The control panel of FIG. 13 is illustrative only and shows a control for, for example, the flow ratio controller or selector valve 44, the flow transmitter 41 for the oxidizing agent, a proportioning control valve 115 and a fluid flow measuring device 116.

Ultrasonic power supply generators are indicated on the panel by reference characters 118 and 119. Flow recording meters are indicated by the characters 120 and 121 and flow ratio controller by the reference character 122. A remote manual selector valve for control of the total flow leaving the reactor is shown at 123 and a manual automatic flow ratio selector valve at 124. Because of the nature of the apparatus and process made possible by the arrangement of equipment shown careful control and regulation is a requisite and for adequate effectiveness all controls and indicators need to be concentrated at a single location.

Although the application of the chemical reactor for the mine processing industry has been detailed in this disclosure, there are other significant uses for the chemical reactor in the chemical processing industry generally where such methods and technology may be utilized in other forms of processing namely dispersion, cleaning, chemical washing, mechanical agitation, mixing and completion of chemical reactions by the introduction of various forms of oxidizing agents in a controlled manner.

Having described the invention, what is claimed as new in support of Letters Patent is as follows:

1. A device for enhancing reactions in a flowing stream of substantially liquid material comprising a tube having a stiff relatively thin straight cylindrical integrally homogeneous wall of resonant material forming a passageway therethrough for said liquid material, an inlet port to said passageway and an outlet port from said passageway, and at least one ultrasonic transducer anchored integrally on the wall of the tube at a wave length antinodal point when under resonance by action of said ultrasonic transducer, the wall of said tube which forms the passageway being at resonance throughout its entire length and circumference during operation in response to action of said transducer, opposite ends of said tube having each a mounting at respective wave length nodal points, whereby energy emanating from said tube passes in a radial direction into said passageway throughout its entire length and circumference.

2. A device for enhancing reactions in a constantly flowing stream of substantially liquid material comprising an outer tube having a stiff straight cylindrical integrally homogeneous wall, an inner tube having a stiff straight cylindrical integrally homogeneous wall concentrically mounted within and spaced clear of the outertube throughout the length and circumference of said tube, the outer diameter of the inner tube being smaller than the inner diameter of the outer tube and forming an annular passageway therebetween for said liquid material, an inlet port adjacent the one end of the passageway and an outlet port adjacent the other end, one of said tubes being a resonant tube of resonant material, said resonant tube having support mountings at opposite ends at wave length nodal points, said inner tube having a chamber extending therethrough, and at least one ultrasonic transducer anchored integrally on the wall of said resonant tube at a location substantially coincident with a wave length antinodal point of the resonant tube when the tube is at resonance by action of said ultrasonic transducer, said resonant tube throughout its entire length and circumference being at resonance during operation in response to action of said transducer whereby energy emanating from said resonant tube passes in a radial direction into said annular passageway throughout its entire length and circumference.

3. A device for enhancing reactions as in claim 2 wherein the outer tube is a resonant tube and the inner tube is a non-resonant tube.

4. A device for enhancing reactions as in claim 2 wherein the inner tube is a resonant tube and the outer tube is a non-resonant tube.

5. A device for enhancing reactions as in claim 2 wherein both tubes are resonant tubes and the ultrasonic transducer is anchored integrally on the outer tube.

6. A device for enhancing reactions as in claim 2 wherein there are a plurality of ultrasonic transducers anchored integrally to the respective tube at locations spaced longitudinally from each other on the resonant tube and at respective wave length antinodal points.

7. A device for enhancing reactions as in claim 2 wherein there are a plurality of ultrasonic transducers anchored integrally to the respective tube at locations spaced circumferentially from each other on the resonant tube and at respective wave length antinodal points.

8. A device for enhancing reactions as in claim 2 wherein there are a plurality of ultrasonic transducers anchored integrally to the respective tube at locations spaced circumferentially from each other on the resonant tube and a plurality of ultrasonic transducers anchored integrally to the respective tube at locations spaced longitudinally from each other on the resonant tube, said spacing being at whole wave length intervals and at wave length antinodal points.

9. A device for enhancing reactions as in claim 2 wherein there is a supply line for liquid material connected to said inlet port, means for creating a pressure condition in said supply line and a gas aspirator in said supply line for introducing gas to said liquid material.

10. A device for enhancing reactions as in claim 2 wherein the respective ends of said tubes are anchored together in sealed rigid relationship.

11. A reactor system according to claim 2 including a source of liquid material to be treated, a source of chemical reagent material for treatment of the liquid material, said tubes comprising an ultrasonic transmission assembly having a continuous passageway therethrough subject to ultrasonic cavitation, fluid leads respectively from said sources to said passageway, and a discharge lead therefrom, the combination of a control system comprising liquid flow sensing means for the lead from the source of liquid material, chemical reagent sensing means for the lead from the source of chemical reagent material, a flow ratio controller in communication respectively with both said sensing means, a control means between said flow ratio controller and one of said leads adapted to constantly regulate the flow in the last identified lead in proportion to the flow in the other lead.

12. A control system according to claim 11 wherein the said one lead subject to constant regulation is the lead from the source of chemical reagent material.

13. A control system according to claim 11 wherein there is a forced return flow means from said agitator assembly to said source of liquid.

14. A control system as in claim 11 wherein said flow ratio controller is manually adjustable to a selected ratio.

15. A control system as in claim 11 wherein there is a return lead from the discharge lead to said source of liquid material.

16. A device for enhancing reactions as in claim 2 wherein there is a sound wave isolation mount for each respective end of said resonant tube.

17. A device for enhancing reactions according to claim 2 including a source of liquid material to be treated, a source of chemical reagent material for treatment of the liquid material, said tubes comprising an ultrasonic transmission assembly having a continuous passageway therethrough subject to ultrasonic fluid cavitation, fluid leads respectively from said sources to said passageway, and a discharge lead therefrom, the combination of a control system comprising liquid flow sensing means for the lead from the source of liquid material, chemical reagent sensing means for the lead from the source of chemical reagent material, a flow ratio controller in communication respectively with both said sensing means, and a control means between said flow ratio controller and one of said leads adapted to constantly regulate the flow in the last identified lead in proportion to the flow in the other lead.

18. A device for enhancing reactions as in claim 6 wherein the resonant tube is of metallic material with a modulus of elasticity within a range between about 21,500,000 and 30,000,000.

19. A device for enhancing reactions as in claim 2 wherein there are a plurality of ultrasonic transducers having anchored attachments on the exterior wall of the resonant tube spaced apart at multiples of whole wave length intervals, each said attachment comprising a flat area on the respective transducer, a complementary flat area on the exterior wall of the resonant tube, the flat area on the exterior wall of the resonant tube being at a depth part way through said exterior wall, and an integral homogeneous fastening medium anchoring the flat areas together to form the attachment between the transducer and the exterior wall of the resonant tube.

* * * * *